United States Patent
McCloskey et al.

(10) Patent No.: US 10,183,811 B1
(45) Date of Patent: Jan. 22, 2019

(54) STACKER DRIVE MODULE

(71) Applicant: McCloskey International, LTD., Keen (CA)

(72) Inventors: Paschal James McCloskey, Keen (CA); Allan Nottingham, Keen (CA); Andrzej Krol, Keen (CA)

(73) Assignee: McCloskey International Limited, Keen, Ontario (CA)

( * ) Notice: Subject to any disclaimer, the term of this patent is extended or adjusted under 35 U.S.C. 154(b) by 0 days.

(21) Appl. No.: 15/725,721

(22) Filed: Oct. 5, 2017

(51) Int. Cl.
| | |
|---|---|
| *B65G 41/00* | (2006.01) |
| *B65G 21/14* | (2006.01) |
| *A01C 15/00* | (2006.01) |
| *B62D 13/00* | (2006.01) |
| *B66F 9/07* | (2006.01) |

(52) U.S. Cl.
CPC .......... *B65G 41/008* (2013.01); *A01C 15/003* (2013.01); *B62D 13/005* (2013.01); *B65G 41/002* (2013.01); *B65G 21/14* (2013.01); *B65G 41/005* (2013.01); *B66F 9/07* (2013.01)

(58) Field of Classification Search
CPC .... B65G 41/008; B65G 41/02; B65G 41/002; B65G 15/24; B65G 65/28
USPC ................................................. 198/300, 313
See application file for complete search history.

(56) References Cited

U.S. PATENT DOCUMENTS

| | | | | |
|---|---|---|---|---|
| 3,563,364 A * | 2/1971 | Arndt | ................... | B65G 41/002 198/304 |
| 4,135,614 A * | 1/1979 | Penterman | ........... | B65G 41/008 198/306 |
| 6,129,196 A * | 10/2000 | Lapper | .................. | B65G 21/14 198/313 |
| 6,360,876 B1 * | 3/2002 | Nohl | .................... | B65G 41/008 198/302 |
| 6,471,031 B1 * | 10/2002 | Duncalf | ................. | B65G 21/12 198/311 |
| 6,929,113 B1 * | 8/2005 | Hoover | .................. | B65G 21/14 198/313 |
| 8,584,826 B2 * | 11/2013 | Smith | .................. | B65G 41/008 198/302 |
| 2016/0355351 A1 * | 12/2016 | Enge | ...................... | B65G 43/00 |

FOREIGN PATENT DOCUMENTS

| | | | | |
|---|---|---|---|---|
| CA | 1065784 | * | 6/1979 | ............. B65G 15/24 |
| WO | 2011/151378 | * | 12/2011 | ............. B65G 65/28 |

* cited by examiner

*Primary Examiner* — James R Bidwell
(74) *Attorney, Agent, or Firm* — Schwabe, Williamson & Wyatt, P.C.

(57) ABSTRACT

A belt-type, portable, radial conveyor system is provided that may include a conveyor frame extending from a rear end to a front end, and having rear portions and front portions, a hopper disposed adjacent the rear end of the conveyor frame, a conveyor belt mounted to the conveyor frame, a tracked or wheeled drive carriage to support the conveyor system during relocation from site to site, and an engine mounted to the rear portion of the conveyor frame remote from the carriage.

9 Claims, 7 Drawing Sheets

STACKER DRIVE MODULE

TECHNICAL FIELD

Embodiments herein relate to the field of stacking equipment used to stack gravel and other bulk materials.

BACKGROUND

A wide variety of conveying equipment is used to stack bulk material such as gravel, coal, sand, grain, wood waste, dirt and other particulate. Such equipment often is in the form of a belt-type conveyor system, which is able to convey bulk material from crushing and/or screening equipment to create one or more stockpiles or stacks. The stockpiles may take the form of individual conical stacks but more often take the form of an array of stacks formed through the use of so-called radial stackers that can swing radially from side-to-side. Other stackers may be in the form of telescoping stackers, which may also be radial stackers and which are sometimes able to form larger and higher stacks.

Radial stackers have in recent years been designed to be portable. Portable stackers use a carriage having wheels or tracks that are typically mounted to support the power source, usually an internal combustion engine, which provides hydraulic power to the working components of the stacker. Drive pulleys, reduction gearing and clutch assemblies are typically positioned adjacent the engine. When wheeled carriages are used, the conveyor can be pulled down the highway by a tractor instead of having to be loaded onto a flat-bottomed trailer, which is normally the case with tracked carriages. In order to shorten the length and the height of the stacker, the front and/or the rear ends of the stacker are often designed to be folded over one another.

While these stacker designs have proven very popular and successful for many operations, two inherent drawbacks exist with such designs. First, the weight of the engine is centrally disposed, and this limits the height or length of the conveyor because otherwise the front end of the stacker might become unstable and perhaps even topple over. This in turn limits the angle of extension and thus the height of the stack. This issue is addressed in part in McCloskey's U.S. Pat. No. 6,129,196, which is incorporated herein by reference. Second, with the heaviest portion of the stacker, the carriage-mounted engine and its fuel tank, is disposed well away from the fifth wheel of the tractor that is pulling the stacker down the highway. This can result in less stability, which may limit the speed and the type of roads over which the stacker can be pulled. A third drawback is that as the front and/or rear of the stacker is folded over for transport to another site, the size of the engine, the drive pulleys and the reduction gearing assembly prohibits the folding conveyor to fold as low as it could if the engine was not there or was relocated. This may limit the length of the conveyor or otherwise diminish its size, possible resulting in a reduction the capacity of the stacker or, again, a reduction in the size of the stack formed by the stacker. This sometimes forces the manufacturer to use a less powerful, electric-driven system, which may require batteries or an electric power source.

Finally, because the size of the engine, drive pulleys and reduction gearing varies greatly from unit to unit, the mounting of these drive components has often required customized mountings, increasing the cost of fabrication and complicating modular fabrication and assembly or rendering such impossible. Examples of such prior art units can be seen in U.S. Pat. No. 4,135,614 (FIG. 3), U.S. Pat. No. 6,360,876 (FIG. 2), and U.S. Pat. No. 8,584,826 (FIG. 1).

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense.

Various operations may be described as multiple discrete operations in turn, in a manner that may be helpful in understanding embodiments; however, the order of description should not be construed to imply that these operations are order-dependent. The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide a system for the mounting of the engine into the conveyor frame of the stacker instead of positioning the engine and associated components adjacent the wheels or tracks at the base of the stacker. This shifts the center of gravity toward the hopper end of the conveyor, thus permitting the stacker to extend farther out and up, allowing a higher angle of extension and thus a higher stack. This can dramatically affect stacking operations, facilitating less moving of the stacker and associated down time, less acreage needed for stacking since the stacks are higher, and potentially a higher load and heavier materials permitted with the same weight of conveyor belts and other conveyor components.

Shifting the center of gravity rearwardly by positioning the engine and other drive components in the conveyor frame toward the fifth wheel rather than adjacent the wheeled or tracked carriage may stabilize the stacker as it is mounted to the fifth wheel to be pulled from site to site. This increased stability may facilitate higher highway speeds and permit transport over less than ideal road surfaces.

By positioning the drive components in the conveyor frame instead of adjacent the wheeled or tracked carriage, the collapsed conveyor can take a decidedly lower profile. This not only avoids the issue of possibly exceeding highway height restrictions but also might permit the conveyor frame and the engine and other drive components to be heavier and larger, thus further potentially increasing the capacity of the conveyor and/or the speed of conveyance. This might also facilitate additional folds in the conveyor, further increasing the potential length and height of the conveyor, and thus correspondingly increasing the size and height of the stacks.

Because there does not need to be customized installation and mounting of the engine and other drive components, those mountings can be modular, easing and speeding assembly operations. Specifically, the engine and other drive components can be installed into a module that is fabricated and assembled at a location remote from the assembly of the conveyor. Then, when appropriate, the entire module can be installed into the conveyor frame. This may permit the manufacturing and assembly to be expedited and may permit a smaller manufacturing facility. This design also permits modular replacement of the engine and other drive components, minimizing down time and perhaps even permitting such operations to be performed in the field, rather than requiring relocation to the manufacturer's facility.

It should be understood that the features of the described embodiments are not limited to portable, radial or telescoping stackers. Many of the advantages may be achieved if the embodiments are incorporated into stationary stackers. For example, the rearward shift in the center of gravity would be as much of an advantage to stationary stackers as mobile stackers, permitting the conveyor to be longer and higher and perhaps even heavier-duty to increase payloads. Of course, modular manufacturing and assembly operations would expedite manufacturing operations whether the stacker is stationary or mobile.

A stacking system for conveying bulk material is provided, which includes a conveyor frame designed to support a conveyor belt, the conveyor frame including forward and rear portions. A hopper may also be included to receive the bulk material, the hopper being mounted to the rear portion of the conveyor frame. A drive carriage including wheels or tracks for supporting the conveyor frame and facilitating relocation of the stacking system may also be provided. In such a system, a drive module may be mounted to the rear portion of the conveyor frame, independent of the drive carriage. An engine is included for providing power to the stacking system. A drive pulley may be included for driving the belt, with the engine and drive pulley being mounted within the drive module, the engine providing drive power to the drive pulley.

A belt-type, portable, radial conveyor system may also be provided. The system may include a conveyor frame extending from a rear end to a front end, and having rear portions and front portions, a hopper disposed adjacent the rear end of the conveyor frame, a conveyor belt mounted to the conveyor frame, a tracked or wheeled drive carriage to support the conveyor system during relocation from site to site, and an engine mounted to the rear portion of the conveyor frame remote from the carriage.

Another way to describe what is being provided is a method for assembling a belt-type conveyor system, including the following steps, not necessarily in the order recited: selecting a foldable, belt-type conveyor with a conveyor frame having front, middle and rear portions and a hopper disposed adjacent the rear portion; mounting the conveyor frame to a wheeled or tracked carriage to permit the conveyor to be moved between work sites; mounting a power drive component and a drive pulley to a modular frame; mounting the power drive component and the drive pulley to each other such that the power drive component provides power drive to the drive pulley; mounting the modular frame to the rear portion of the conveyor frame; and providing power from the power drive component to the carriage and to the conveyor. This method may be said to describe the step of mounting the power drive component and the drive pulley to each other such that the power drive component provides power drive to the drive pulley includes the power drive component directly driving the drive pulley.

Figure 5:
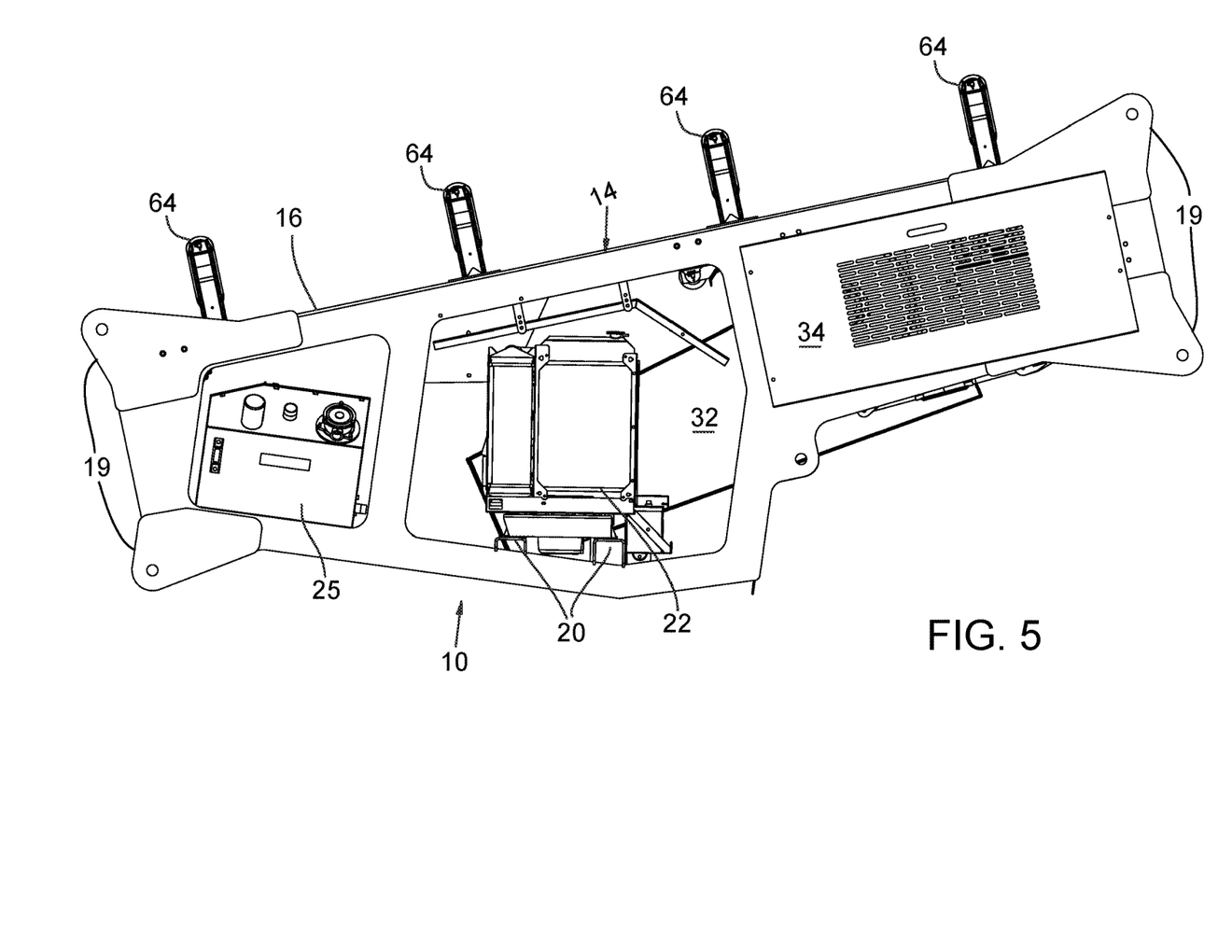
FIG. 5 is a side elevation view of the left side of the embodiment of the module of FIGS. 1-4, showing the components that may be mounted into it, with the belt removed for illustrative purposes.
Figure 6:
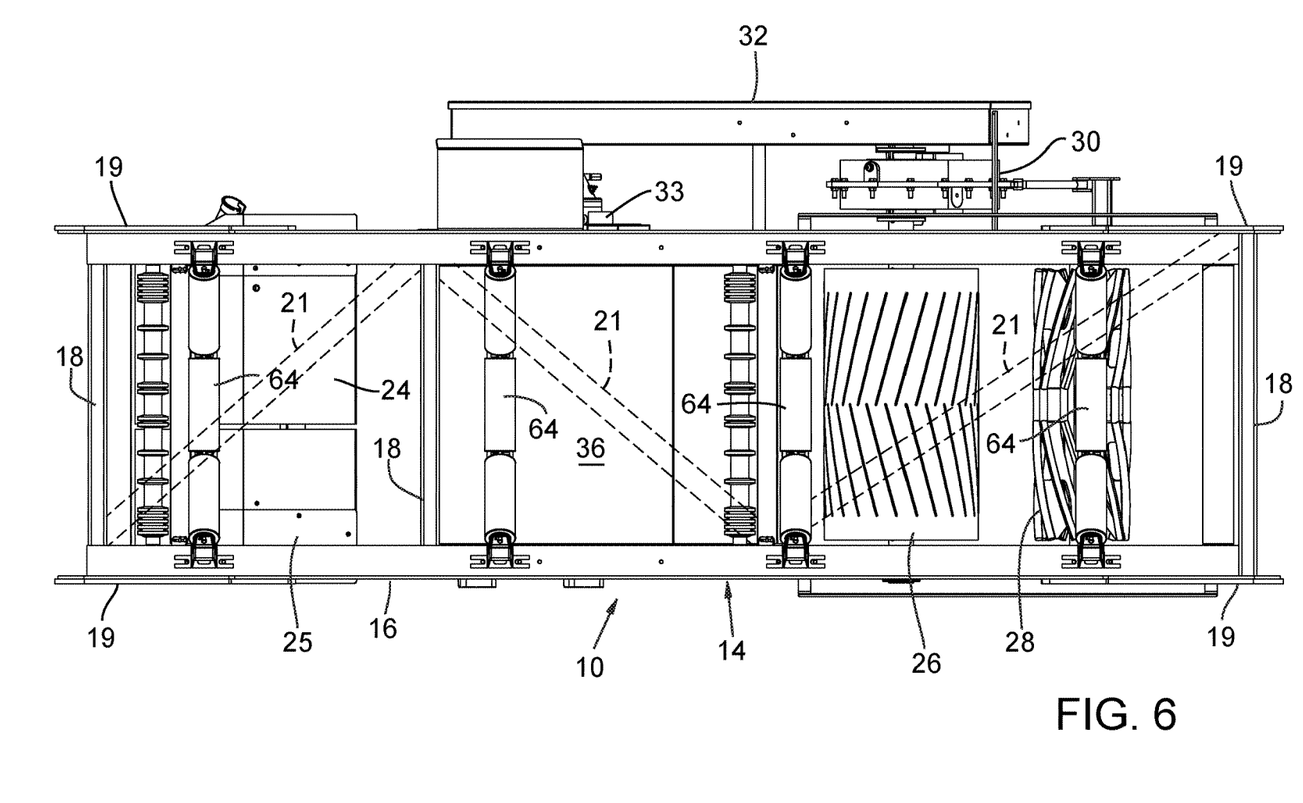
FIG. 6 is a top plan view of the embodiment of the module of FIGS. 1-5, showing the components that may be mounted into it, with the belt removed for illustrative purposes.
Figure 7:
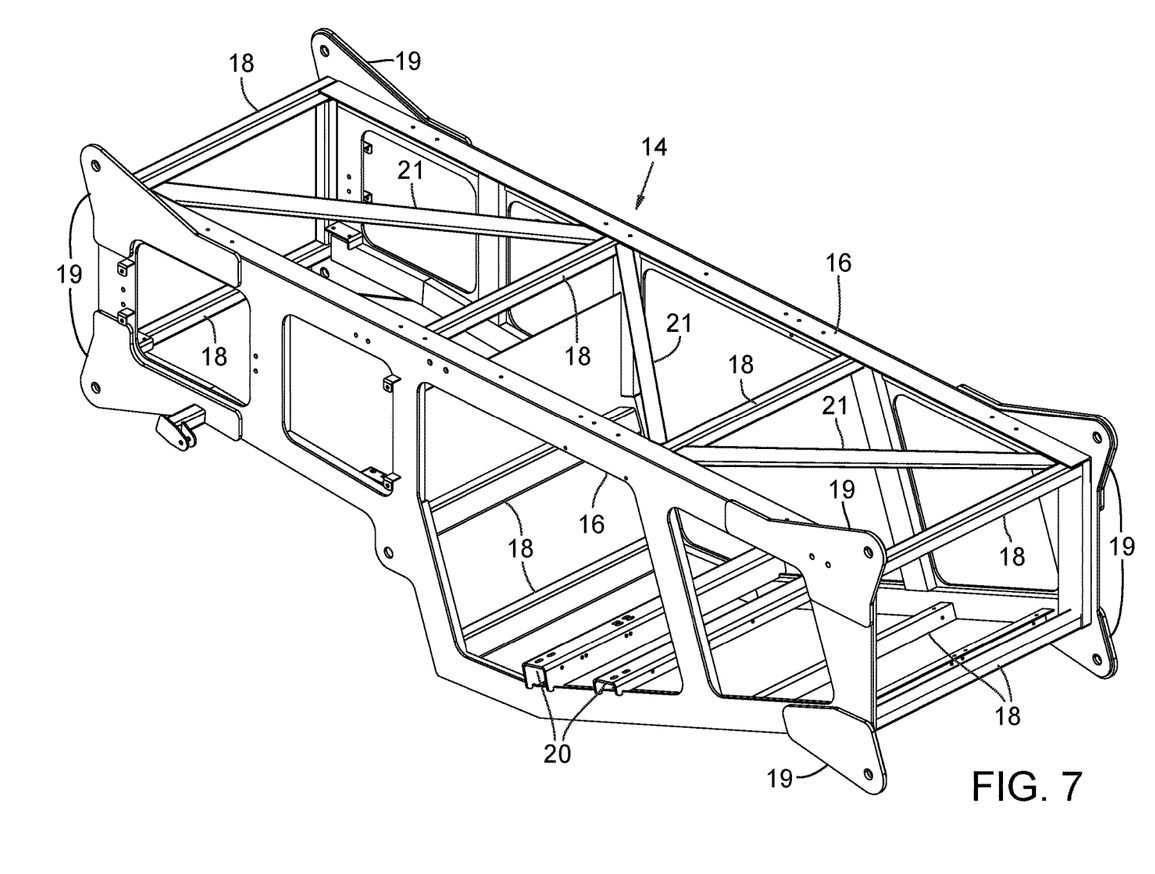
FIG. 7 is a perspective view of the frame for the embodiment of the module of FIGS. 1-6, with the engine, other power components and the belt removed for illustrative purposes.

Referring now to the figures, a modular system for incorporating an engine and other components for providing power to a stacker is shown generally at 10. A typcial portable radial stacker to which the modular system 10 may be mounted is best shown at 12 in FIGS. 1 and 8. Modular system 10 includes a frame 14 such as best shown in FIGS. 5 and 7. Frame 14 and includes side plates 16, cross bracing 18, engine supports 20, mounting plates 19, and diagonal bracing 21. Diagonal bracing 21 is shown in phantom in FIG. 6 in order not to obscure other components. Diagonal bracing 21 may be bolted in place rather than welded or riveted to facilitate installation and removal and replacement of other components. The use of a modular frame system like that which is depicted may permit the engine, reduction gearing, clutch assemblies, fuel tanks and other components for providing power to be assembled away from the site of fabrication of the stacker itself. The modular system can then be mounted in place at a time and place that is most convenient. This modular system may also permit the entire drive system to be replaced in certain situations without tearing apart the entire stacker.

Figure 3:
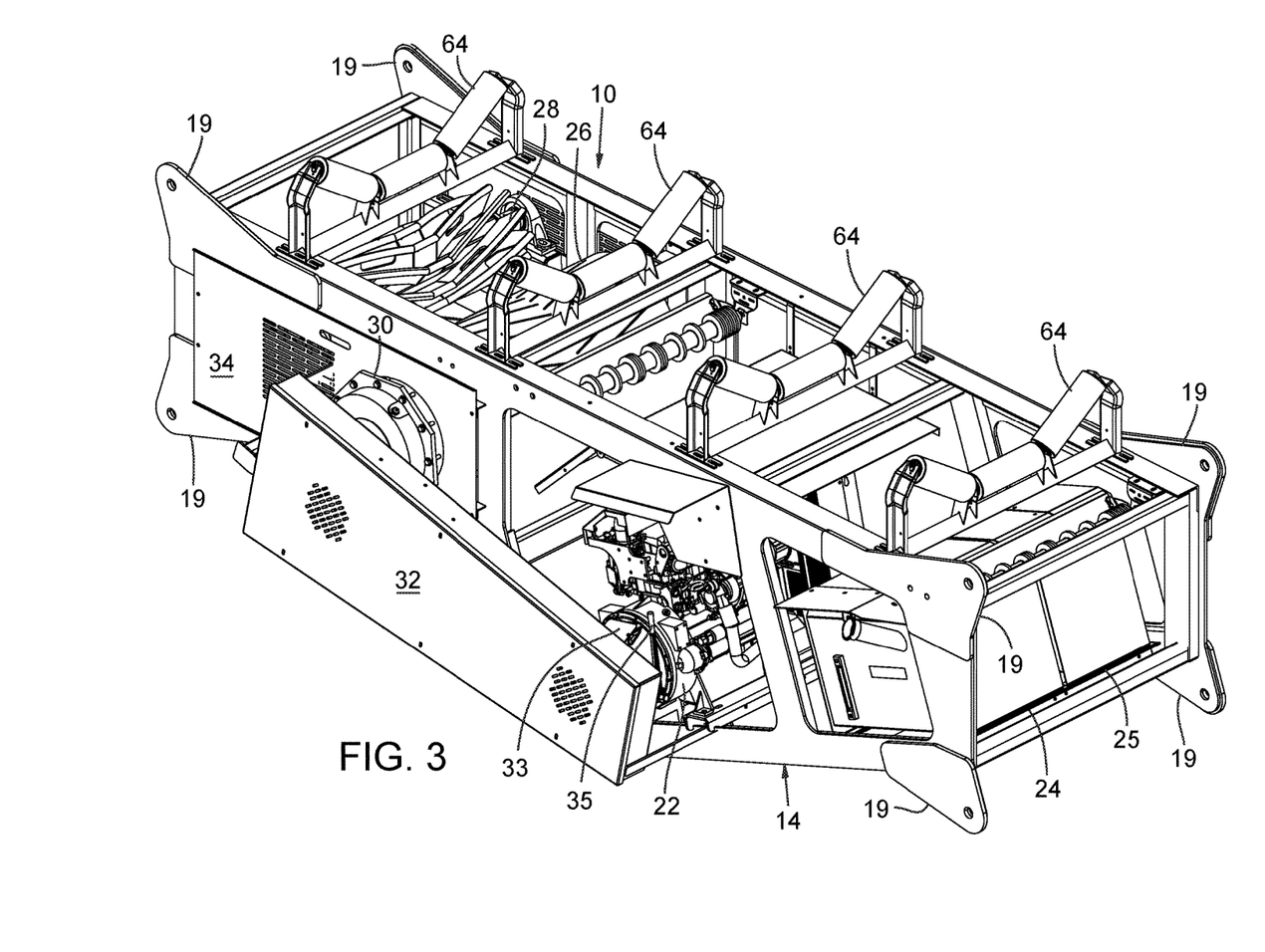
FIG. 3 is a perspective view of the embodiment of the module of FIGS. 1 and 2, showing components that may be mounted into it, with the belt removed for illustrative purposes.
Figure 4:
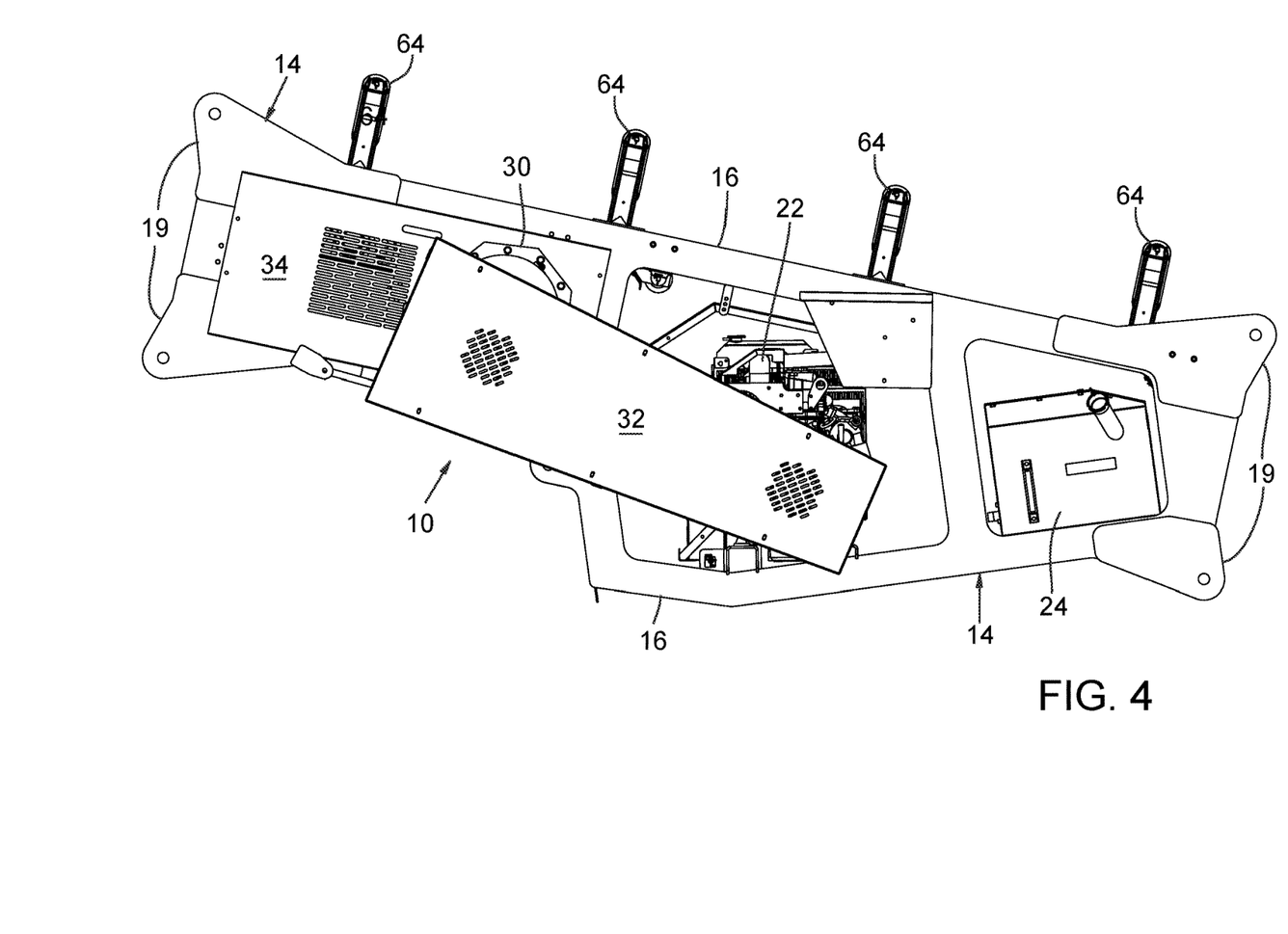
FIG. 4 is a side elevation view of the right side of the embodiment of the module of FIGS. 1-3, showing the components that may be mounted into it, with the belt removed for illustrative purposes.

As shown in FIG. 5, an engine 22 is positioned within frame 14 on engine supports 20. Engine 22 will usually be a diesel or other internal combustion engine but instead of an engine, an electric motor may be provided with suitable batteries or with an electrical connection to an electric power source (neither of which is shown). Either could be called a power drive component. A fuel tank 24 is also mounted within frame 14, normally disposed rearwardly of the engine, on the right side of the frame. A somewhat smaller hydraulic oil tank 25 may be mounted on the left side of frame 14, in alignment with fuel tank 24, as best shown in FIG. 3. This accomplishes the goal of shifting as much of the weight as possible to the rear of the stacker 12 to which the modular system 10 is mounted. It may also be desirable to include a counterweight 27 (see FIG. 1) adjacent the rear end of stacker 12 to provide additional weight to the rear of the stacker. Whether or not such a counterweight is necessary will depend upon the particular application.

Also mounted within frame 14 is a large drive pulley 26 and a wrap pulley 28, which operate in a conventional fashion to engage and drive a conveyor belt, which has not been shown in the figures since it would cover many of the components that are being discussed. A reducing gear 30 is mounted to one end of drive pulley 26 in a conventional manner. The reducing gear is connected by drive belts that are disposed behind a drive belt guard 32. Clutch 33 and clutch control handle 35 are shown in FIGS. 3 and 6. Such clutches might be in the form of either manual or hydraulic control clutches. A guarding cover 34 may be positioned over each side of the drive pulley 26 and wrap pulley 28, and a dust cover 36 may be disposed over engine 22. The engine may be said to directly drive the drive gear. This is meant to cover a belt or gear drive, and may be via a reduction gear or transmission such as that in the depicted embodiment. An embodiment may also be provided in which the engine provides hydraulic power to a hydraulic motor, also mounted to the frame, to drive the drive pulley. Another way to describe this system is that the engine would be disposed remote from the carriage; that is, the engine would not be mounted to the carriage.

Figures 1, 2:
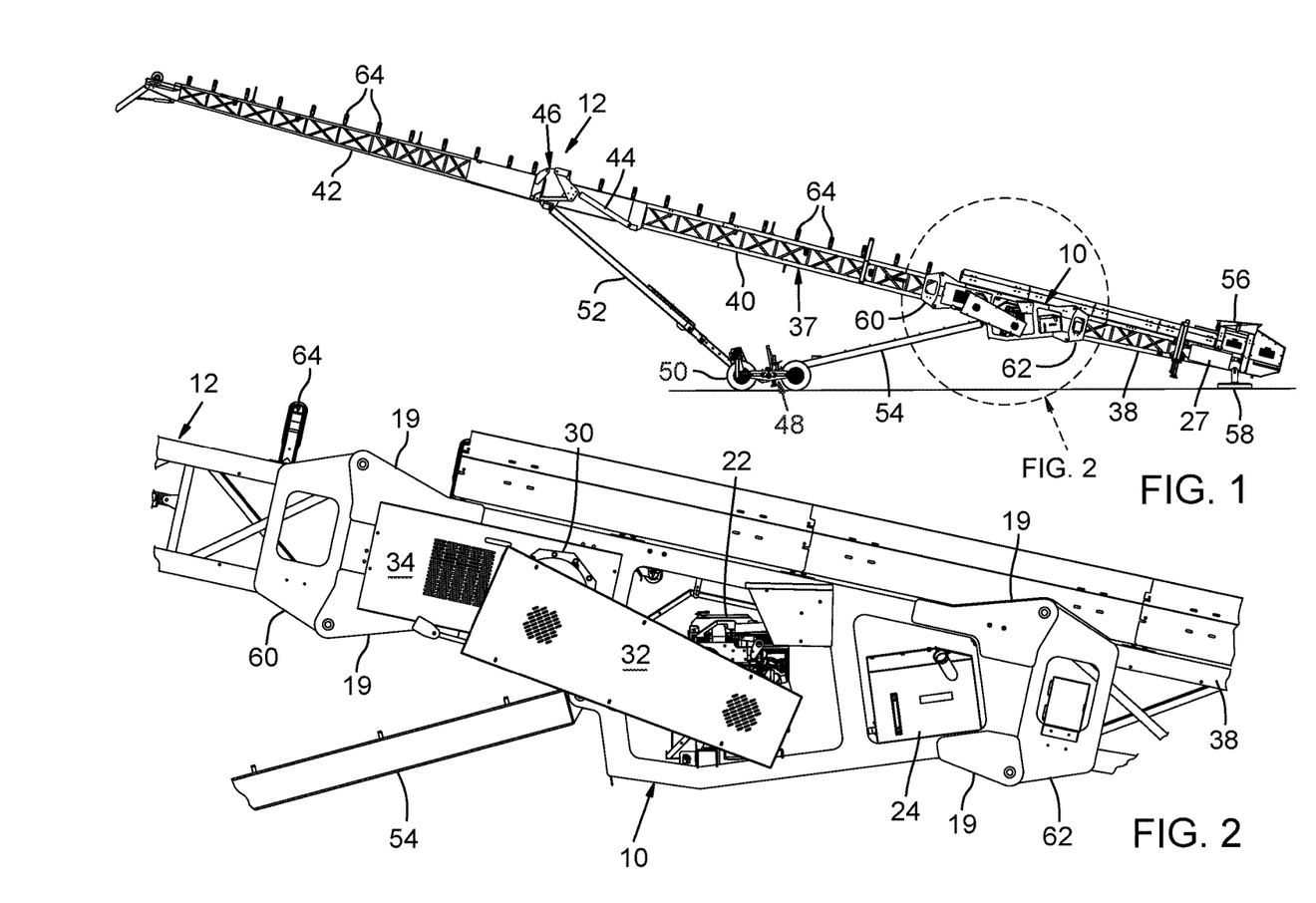
FIG. 1 is side elevation view of the right side of an embodiment of a module incorporated into a stacker.
FIG. 2 is a fragmentary, enlarged side elevation view of the right side of the embodiment of the module of FIG. 1 incorporated into a stacker, corresponding to FIG. 1.
Figure 8:
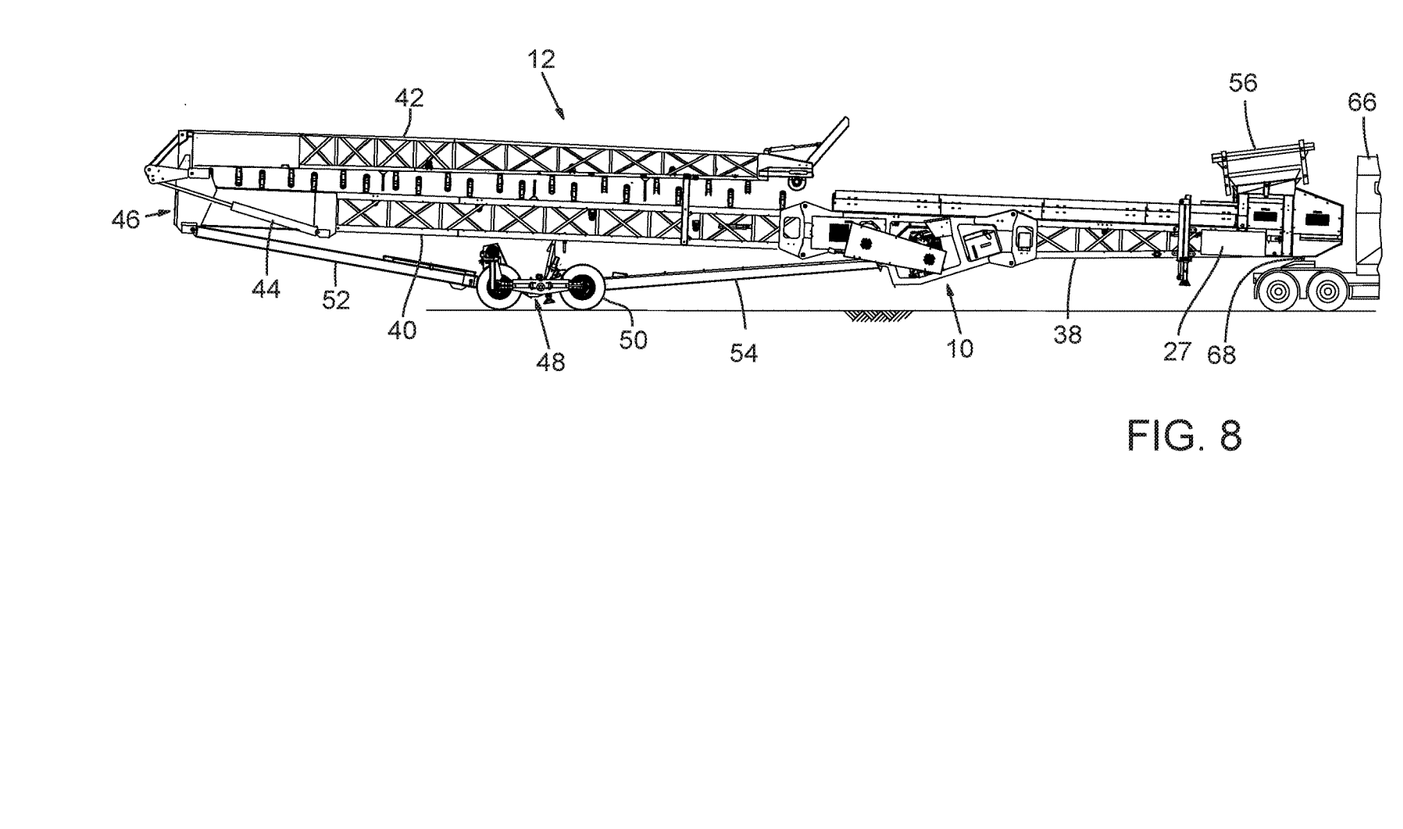
FIG. 8 is a side elevation view of the embodiment of the module of FIGS. 1-7 mounted to a stacker, with the stacker being folded over and mounted to the fifth wheel of a tractor for moving the stacker from one work site to another.

Much of the design of stacker 26 is conventional. As shown in FIGS. 1 and 8, the stacker includes a conveyor frame 37 made up of a tail truss 38, a center truss 40 and a head truss 42. A hydraulic cylinder 44 is provided at a pivot joint 46 for pivoting head truss 42 over center truss 40 in conventional fashion. What is different about the depicted embodiment is that the head truss is longer than on many conventional stackers since the rearward placement of the modular system shifts the center of gravity rearward compared to systems in which the engine and the other drive components are disposed adjacent the carriage which supports the stacker.

FIGS. 1 and 8 show a carriage 48, including two pairs of drive wheels 50, supporting stacker 12. As noted, instead of wheels, the carriage may alternatively include a pair of tracks. In any event, the carriage is designed to permit the stacker to maneuver around the job site. A pair of frame members 52 and 54 may extend from carriage 48 to support stacker 12. Both frame members are typically in the form of telescoping hydraulic cylinders, which provide a high degree of control to the extension angle of the stacker. Front frame member 52 may be pivotally mounted to conveyor frame 37 adjacent pivot joint 46. Rear frame member 54 may be pivotally mounted to tail truss 38 adjacent modular system 10.

As shown in FIG. 1, a conventional hopper 56 may be disposed at the rear end of stacker 12 adjacent counterweight 27, and a pivot point 58 is provided to permit radial pivoting of the stacker.

A front pin plate 60 may be provided to mount the front end of modular system frame 14 to conveyor frame 37 by pins, bolts, rivets and/or welds, and a rear pin plate 62 is provided to mount the rear end of modular system frame 14 to conveyor frame 37, again, by pins, bolts, rivets and/or welds.

As noted previously, a conveyor belt has not been depicted although the belt would be of conventional design, fabricated of rubber or plastic, perhaps with metal reinforcement. The belt is designed to travel on conventional rollers 64. As noted earlier, drive pulley 26 and wrap pulley 28 control the operation of the belt as in conventional designs.

FIG. 8 shows the stacker 12 in position behind a tractor 66, mounted to a fifth wheel 68. It can be seen that as a result of the modular system being mounted to the conveyor frame 37 instead of to carriage 48, the stacker 12 can be folded in a more vertically-compact arrangement. In certain systems, this might permit additional folds to the conveyor or might permit the conveyor frame to be heavier-duty, thus further increasing the load it can carry and convey. In any event, shifting the weight of the engine and fuel and hydraulic oil tanks rearwardly on the conveyor frame instead of being mounted to the carriage enables the conveyor to be longer and to incline to a steeper inclination, thus increasing the size of the stacks and speeding conveying operations. Mounting engine 22, fuel tank 24, hydraulic oil tank 25 and other components to conveyor frame 37 in a modular system with a modular frame 14 permits these components to be mounted to the modular frame at one location and time, and then to permit the modular frame with the power the components to be mounted to conveyor frame 37 at the most convenient location and time. This also permits the engine to be mounted in close proximity to the drive pulley with a direct belt drive.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:
1. A conveyor for conveying bulk material, comprising:
a conveyor frame designed to support a conveyor belt having an upward facing side for carrying a load, the conveyor frame including forward and rear portions;

a hopper designed to receive the bulk material, the hopper being mounted to the rear portion of the conveyor frame to collect bulk material and deposit it on the upward facing side of the conveyor belt to create a loaded belt;

a drive carriage including wheels or tracks for supporting the conveyor frame and facilitating relocation of the conveyor, the drive carriage being mounted below and between the forward and rearward portions of the conveyor frame;

a drive module mounted to the rear portion of the conveyor frame, forward of a rear end thereof, independent of the drive carriage; and an engine for providing power to the stacking system, and a drive pulley for pulling the loaded belt in a forward direction from a position forward of the hopper, with the engine and drive pulley being mounted within the drive module, the engine providing drive power to the drive pulley.

2. The conveyor of claim 1 wherein the engine directly drives the drive pulley.

3. The conveyor of claim 1, wherein the conveyor is not a telescoping conveyor.

4. The conveyor of claim 1, wherein the conveyor is a stacker, and the stacker further comprises a front frame member extending between the drive carriage and a forward portion of the conveyor, and a rear frame member extending upwardly from the drive carriage to the rear portion of the conveyor frame at a point forward of the hopper and adjacent to the engine.

5. The conveyor of claim 1 wherein the rear portion of the conveyor frame is rearward of a mid-point of the conveyor frame, and the forward portion of the conveyor frame is forward of a mid-point of the conveyor frame.

6. A method for assembling a conveyor system which is not a telescoping conveyor, comprising the following steps, not necessarily in the order recited:

selecting a conveyor with a conveyor frame having front, middle and rear portions, and a hopper disposed adjacent the rear portion;

mounting the conveyor frame to a wheeled or tracked carriage to permit the conveyor to be moved between work sites;

mounting a power drive component and a drive pulley to a modular frame;

mounting the power drive component and the drive pulley to each other such that the power drive component provides power drive to the drive pulley;

mounting the modular frame to the rear portion of the conveyor frame forward of the hopper; and providing power from the power drive component to the carriage and to the conveyor.

7. The method of claim 6, further comprising the step of mounting a belt to the conveyor system for carrying a load forwardly from the hopper, the drive belt being mounted such that the drive pulley is designed to pull a loaded drive belt forwardly on the conveyor frame.

8. A belt-type, portable, radial stacker, comprising:

a conveyor frame extending from a rear end to a front end of the conveyor system, and having rear portions and front portions;

a hopper disposed adjacent the rear end of the conveyor frame;

a conveyor belt mounted to the conveyor frame;

a tracked or wheeled drive carriage mounted to support the conveyor system during relocation from site to site;

an engine mounted to the rear portion of the conveyor frame forward of the hopper and remote from the carriage; and a pair of telescoping, powered frame members, one of which extends upwardly from the drive carriage to the front portion of the conveyor frame, the other of which extends upwardly from the drive carriage to the rear portion of the conveyor frame at a point forward of the hopper and adjacent to the engine.

9. The radial stacker of claim 8 wherein the stacker is not a telescoping conveyor.

\* \* \* \* \*